US012779513B2

(12) United States Patent
Boos et al.

(10) Patent No.: US 12,779,513 B2
(45) Date of Patent: Nov. 3, 2026

(54) RESIDUAL CONCRETE REMOVAL FROM READY MIXED CONCRETE DRUMS

(71) Applicant: Ready-Jet Technologies, LLC, Tampa, FL (US)

(72) Inventors: Scott F. Boos, Tampa, FL (US); Justin Valdes, Tampa, FL (US)

(73) Assignee: Ready-Jet Technologies, LLC, Tampa, FL (US)

( * ) Notice: Subject to any disclaimer, the term of this patent is extended or adjusted under 35 U.S.C. 154(b) by 0 days.

(21) Appl. No.: 19/551,032

(22) Filed: Feb. 26, 2026

(65) Prior Publication Data

US 2026/0183808 A1 Jul. 2, 2026

Related U.S. Application Data

(63) Continuation of application No. 19/171,529, filed on Apr. 7, 2025, which is a continuation of application (Continued)

(51) Int. Cl.
*B08B 9/08* (2006.01)
*B05B 3/00* (2006.01)

(52) U.S. Cl.
CPC .............. *B08B 9/0813* (2013.01); *B05B 3/00* (2013.01)

(58) Field of Classification Search
None
See application file for complete search history.

(56) References Cited

U.S. PATENT DOCUMENTS 3,465,788 A 9/1969 Tennis
4,827,953 A * 5/1989 Lee ........................ F28G 15/04 165/95

(Continued)

FOREIGN PATENT DOCUMENTS

WO 2008118218 A1 10/2008

OTHER PUBLICATIONS

International Search Report and written opinion for PCT/US2025/051391 filed on Oct. 17, 2025, with a mailing date of Mar. 10, 2026.

(Continued)

*Primary Examiner* — Cristi J Tate-Sims
(74) *Attorney, Agent, or Firm* — Anton J. Hopen; Trenam Law

(57) ABSTRACT

A system and method are disclosed for removing residual concrete from the interior of a ready mixed concrete truck drum using a high-pressure water jet without requiring drum entry. A nozzle housing on an elongated boom contains a rotatable nozzle driven by a motor. An encoder provides nozzle position feedback to a control system that can dynamically set and adjust the nozzle sweep limits, including independent forward and rear stop limits, and can hold the nozzle at a selected angular position. Boom translation can be referenced from a user-set zero position and displayed as travel from the reference. In some embodiments, a dual-controller arrangement includes a mounted controller and a handheld controller synchronized over a communication link with command arbitration. Safety features can include sensor-initiated rapid hydraulic power-down and a breakaway hinge configured to separate at a threshold below a boom plastic deformation threshold.

16 Claims, 17 Drawing Sheets

Related U.S. Application Data

No. 18/920,448, filed on Oct. 18, 2024, now Pat. No. 12,269,076.

(56) References Cited

U.S. PATENT DOCUMENTS

| | | | | |
|---|---|---|---|---|
| 5,244,498 | A * | 9/1993 | Steinke | B08B 9/093 106/806 |
| 6,496,766 | B1 | 12/2002 | Bernold et al. | |
| 7,546,843 | B2 | 6/2009 | Boos et al. | |
| 12,599,943 | B2 * | 4/2026 | Camell | B08B 9/0813 |
| 2007/0079852 | A1 * | 4/2007 | Boos | B08B 9/093 134/167 R |
| 2009/0103392 | A1 | 4/2009 | Bilger | |

OTHER PUBLICATIONS

Ready Jet G4: Up Close, uploaded by Ready-Jet Solutions, Inc. May 9, 2023. https://www.youtube.com/watch?v=j9eg62FJFjQ.

* cited by examiner

RESIDUAL CONCRETE REMOVAL FROM READY MIXED CONCRETE DRUMS

PRIORITY INFORMATION

This application is a continuation of U.S. patent application Ser. No. 19/171,529, filed Apr. 7, 2025, titled "System and Method for Efficient Removal of Residual Concrete From Ready Mixed Concrete Drums," which is a continuation of U.S. patent application Ser. No. 18/920,448, filed Oct. 18, 2024, now U.S. Pat. No. 12,269,076, issued Apr. 8, 2025.

BACKGROUND OF THE INVENTION

Field of the Invention

This invention relates, generally, to systems and methods for removing residual hardened concrete from the interior of ready mixed concrete truck drums using high-pressure water. More particularly, the invention relates to remotely operated drum-cleaning systems having electronically controlled nozzle oscillation with operator-adjustable sweep limits, boom position referencing, and safety features including rapid disengagement from obstructions and breakaway couplings, thereby reducing or eliminating the need for personnel to enter the drum.

Brief Description of Related Art

Ready mixed concrete drums are rotatably mounted on concrete trucks so that the concrete in the drum can be continuously mixed as it is transported from a concrete batching facility to a job site. Upstanding helical fins or blades are mounted on the interior walls of the rotating drum so that concrete at the closed end of the drum is driven to the open end of the drum when the drum is rotated in a discharge direction. The helical fins or blades act as an auger, urging the concrete towards the discharge end of the drum when the drum is in said discharge mode. The helical fins or blades urge the concrete in the other direction when the drum is rotating in a mixing direction.

It is inevitable that some concrete will remain within the drum after each load of concrete has been discharged. Over time, the drum is laden with residual hardened concrete that gradually builds up, substantially increasing the weight of the truck when "empty" and substantially reducing the volume of concrete that the truck can legally haul. The residual concrete also adversely affects the quality of the ready mixed concrete carried by the truck. Some companies combat this problem by attempting to clean the drum at the end of each workday, before the build-up becomes severe. Others just wait until the problem becomes acute.

In the early 2000s, the Applicant of the present invention secured patent rights to a device for cleaning a ready mixed concrete drum as described in U.S. Pat. No. 7,546,843. Over the years several pitfalls were discovered.

One pitfall of the previous version is the nozzle location. The nozzle is set back away from the distal end of the torpedo to allow the nozzle to effectively clean the back side of the fins in the drum. While the nozzle location serves that purpose, it also increases the stand-off distance between the nozzle and the concrete surface being cut. In high pressure water jetting, the jet exits the nozzle at high velocity, but as it travels away from the nozzle it spreads, entrains surrounding fluid, and begins to break up, which reduces jet coherence and causes the jet velocity to decay. Because the cutting effectiveness depends on the kinetic energy delivered to the target and kinetic energy is proportional to the square of the jet velocity, even a relatively small loss in velocity over that stand-off distance results in a dramatic reduction in impact energy and energy density at the target. Accordingly, the effective pressure and cutting power at the distal tip of the torpedo-shaped nozzle housing can be substantially less than would be possible if the nozzle were closer to the distal end of the torpedo-shaped nozzle housing. It turns out that the head of the concrete drum often has the most concrete buildup (often referred to as the "head pack"). The head pack can be several feet thick at times and thus it takes more time to cut through the head pack than to remove the buildup on the fins. In some instances, the head pack is so thick that the offset nozzle of the previous design is unable to cut completely through the concrete.

Another pitfall is that the nozzle on the previous device has a predetermined, non-adjustable stroke length during use. The design includes a rigid link connected to a cam, which causes the nozzle to reciprocate much like a windshield wiper. The degree of rotation or "sweep" (also referred to as "stroke length") can be adjusted by securing a first end of the rigid link to a different location on the cam. However, the stroke length is not adjustable on the fly while the device is in use. The lack of adjustability prevents the user from adjusting the stroke length as the blades change based on the location within the drum. The fixed oscillation results in the water jet directed towards open air at various locations, which is a significant waste of time, water, fuel, and energy.

The previous device also lacks the ability to convey to a user where the nozzle is located within the drum. The drums have bulging middle sections and different size fins spaced about their longitudinal axes. To efficiently clean the drum, the location of the nozzle housing must be known so that a user can adjust the angle of the nozzle housing relative to the longitudinal axis of the boom. However, the previous device lacks the features necessary to precisely convey to an operator the location of the nozzle housing relative to the drum requiring operators to guess where the nozzle housing is located within the dark and steamy drum.

The previous invention is also susceptible to a potentially dangerous and catastrophic situation in which the nozzle housing catches on the rotating fins and/or attaches to debris in the drum and the continued rotation of the drum causes breakage of the boom or nozzle housing.

Accordingly, there is a need for an improved system and method for removing concrete from the inside of ready mixed concrete truck drums. However, in view of the prior art taken as a whole at the time the present invention was made, it was not obvious to those of ordinary skill how the identified needs could be fulfilled.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The background discussion is provided for context. No admission is made that any reference, document, or discussion in this specification constitutes prior art. The claimed subject matter is not limited to the problems described in the background or to the illustrative embodiments described herein.

BRIEF SUMMARY OF THE INVENTION

Systems, assemblies, and methods are disclosed for removing residual concrete from an interior of a rotatably mounted ready mixed concrete truck drum using a high-pressure water jet, without requiring personnel to enter the drum.

In some embodiments, an elongated boom is configured for insertion into the drum and a nozzle housing is coupled to a leading end of the boom. A high-pressure nozzle is rotatably mounted within the nozzle housing and is configured to discharge through a discharge slot formed through the nozzle housing proximate a leading end. A motor is operably coupled to the nozzle to oscillate the nozzle through an angular stroke range, and an encoder provides position feedback to a controller in operable communication with the motor.

In some embodiments, the controller is configured to define and adjust oscillation limits during operation and to command the motor to hold the nozzle at a selected angular position. In some embodiments, a user interface displays a nozzle position indicator and allows an operator to adjust oscillation speed and stop limits.

In some embodiments, a boom translation sensor provides travel information relative to a reference position set by an operator using a boom zeroing actuator.

In some embodiments, a hydraulic system pivots the nozzle housing relative to the boom and provides a rapid power-down function to disengage the nozzle housing from obstructions. In some embodiments, a breakaway hinge provides a release mechanism configured to separate at a predetermined threshold below a boom plastic deformation threshold.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Unless otherwise indicated, numerical values and ranges in this specification are approximate and can vary due to measurement technique, manufacturing tolerances, and operating conditions. The terms "about" and "approximately," when used with a numerical value or range, are intended to encompass such variations.

In some embodiments, controller 136 and related control functions are implemented using one or more processors and associated memory storing instructions executable by the one or more processors. The memory can include non-transitory computer-readable storage media such as ROM, RAM, flash memory, EEPROM, and other storage media suitable for storing electronic instructions.

As used herein, the phrase "in some embodiments" indicates that a described feature, structure, or characteristic may be included in at least one embodiment. References to different embodiments do not necessarily refer to distinct embodiments.

The present invention relates to concrete drum cleaning systems, including systems of the type described in U.S. Pat. No. 7,546,843, and provides improvements in nozzle location and control, boom positioning, nozzle housing positioning, and safety mechanisms.

Figure 1:
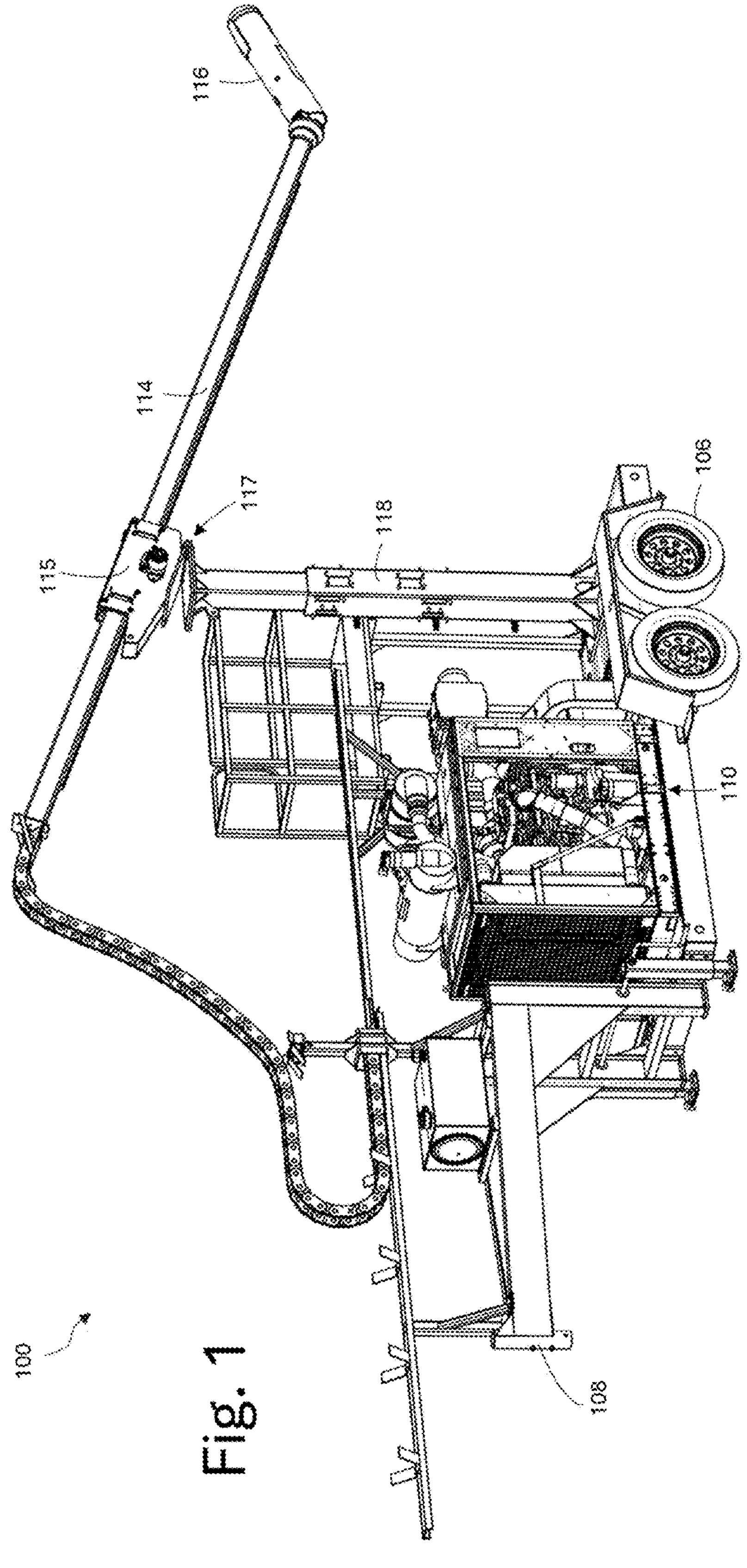
FIG. 1 is a perspective view of an embodiment of the present invention with the boom in an extended orientation.
Figure 2:
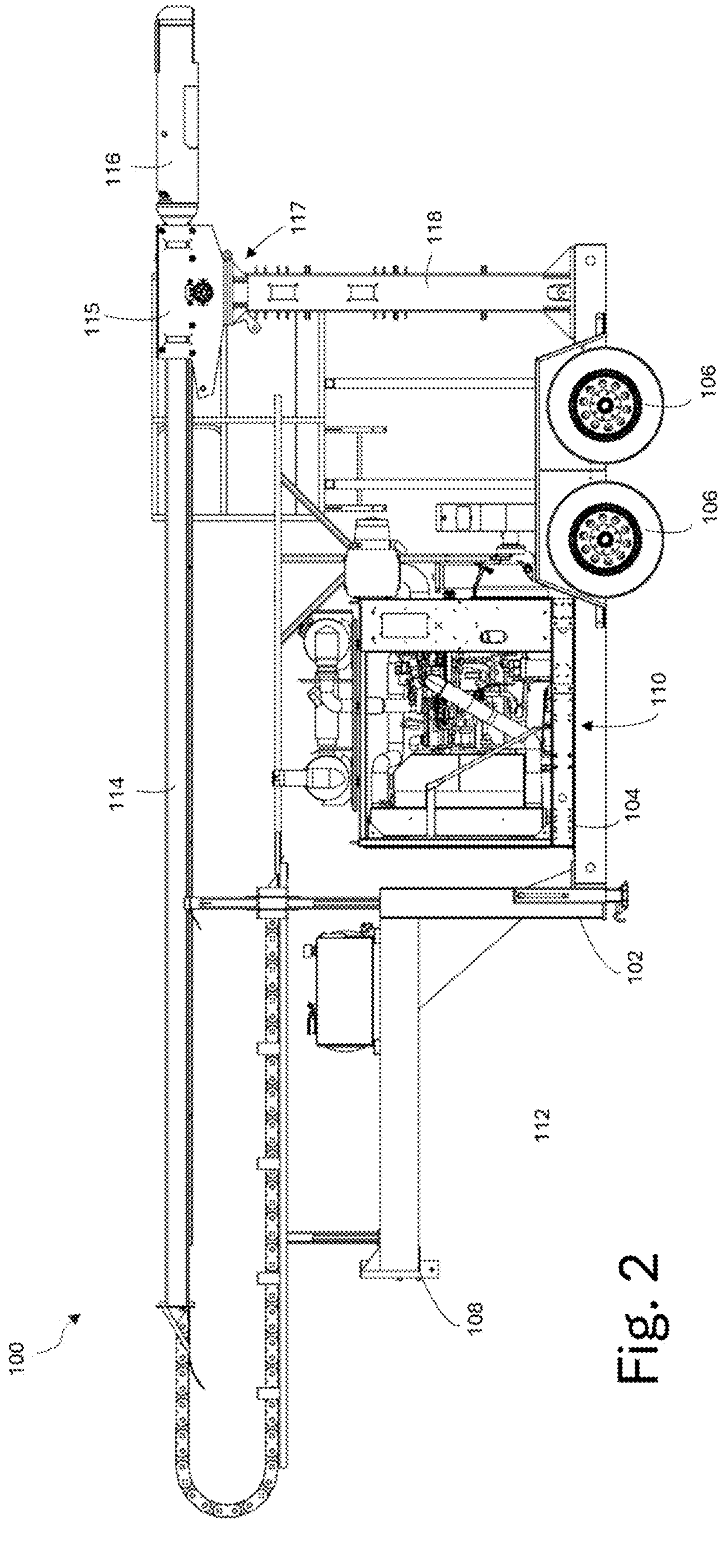
FIG. 2 is a side view of an embodiment of the present invention with the boom in a retracted orientation.
Figure 3:
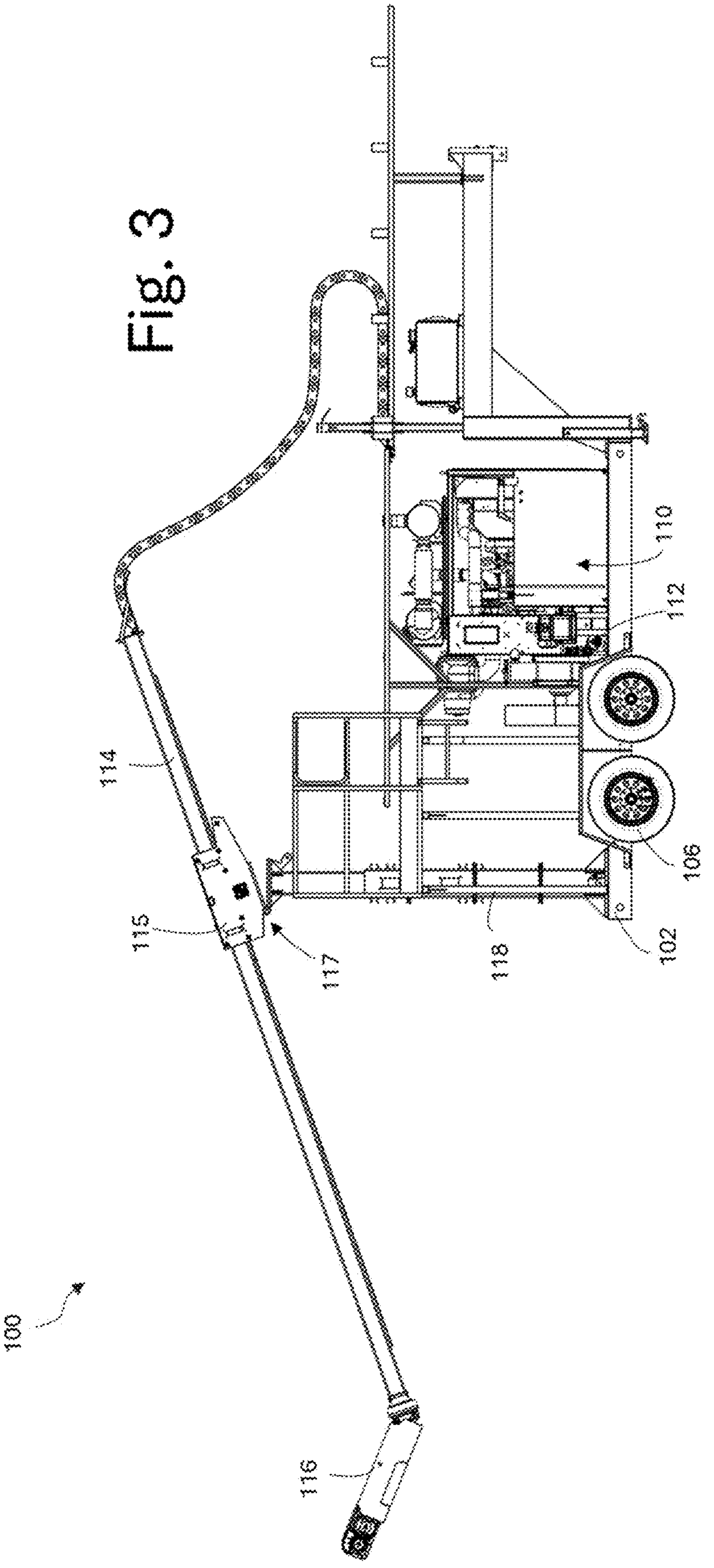
FIG. 3 is a side view of an embodiment of the present invention with the boom in an extended orientation.

Referring to FIGS. 1-3, an embodiment of the invention is designated generally by reference numeral 100. In some embodiments, system 100 includes trailer 102 having trailer bed 104, wheels 106, hitch assembly 108, engine 110, and engine-powered water booster pump 112. System 100 further includes boom 114 and nozzle housing 116 coupled to a leading end of boom 114.

Boom 114 passes through boom housing 115. Boom housing 115 is mounted on hydraulic motor mount assembly 117, and hydraulic motor mount assembly 117 is supported by tower 118. Tower 118 is configured to telescopically adjust the height of boom housing 115 relative to trailer bed 104. The telescopic movement can be driven by an internal hydraulic cylinder or another actuator configured to raise and lower boom housing 115.

As shown in FIG. 3, boom housing 115 is hingedly secured to tower 118 and hydraulic motor mount assembly 117 is in operable communication with boom housing 115 to pivot boom housing 115 about a hinge. Boom housing 115 is further configured to ensleeve elongate nozzle boom 114. Some embodiments include an inclinometer or another sensor known in the art to detect and convey to an operator the insertion angle/hinge angle of boom 114 so that an operator can determine and set the angle of the elongate boom for better cleaning capability.

Boom 114 is mounted atop an elongate rack gear and is secured thereto for conjoint displacement therewith. A pinion gear disposed within boom housing 115 meshingly engages the elongate rack gear on an underside thereof. The pinion gear is secured to an output shaft of a reversible hydraulic motor so that rotation of the output shaft in a first direction causes retraction (leading-to-trailing displacement) of boom 114 and rotation of said output shaft in a second direction opposite to said first direction causes extension (trailing-to-leading displacement) of boom 114.

Figure 4:
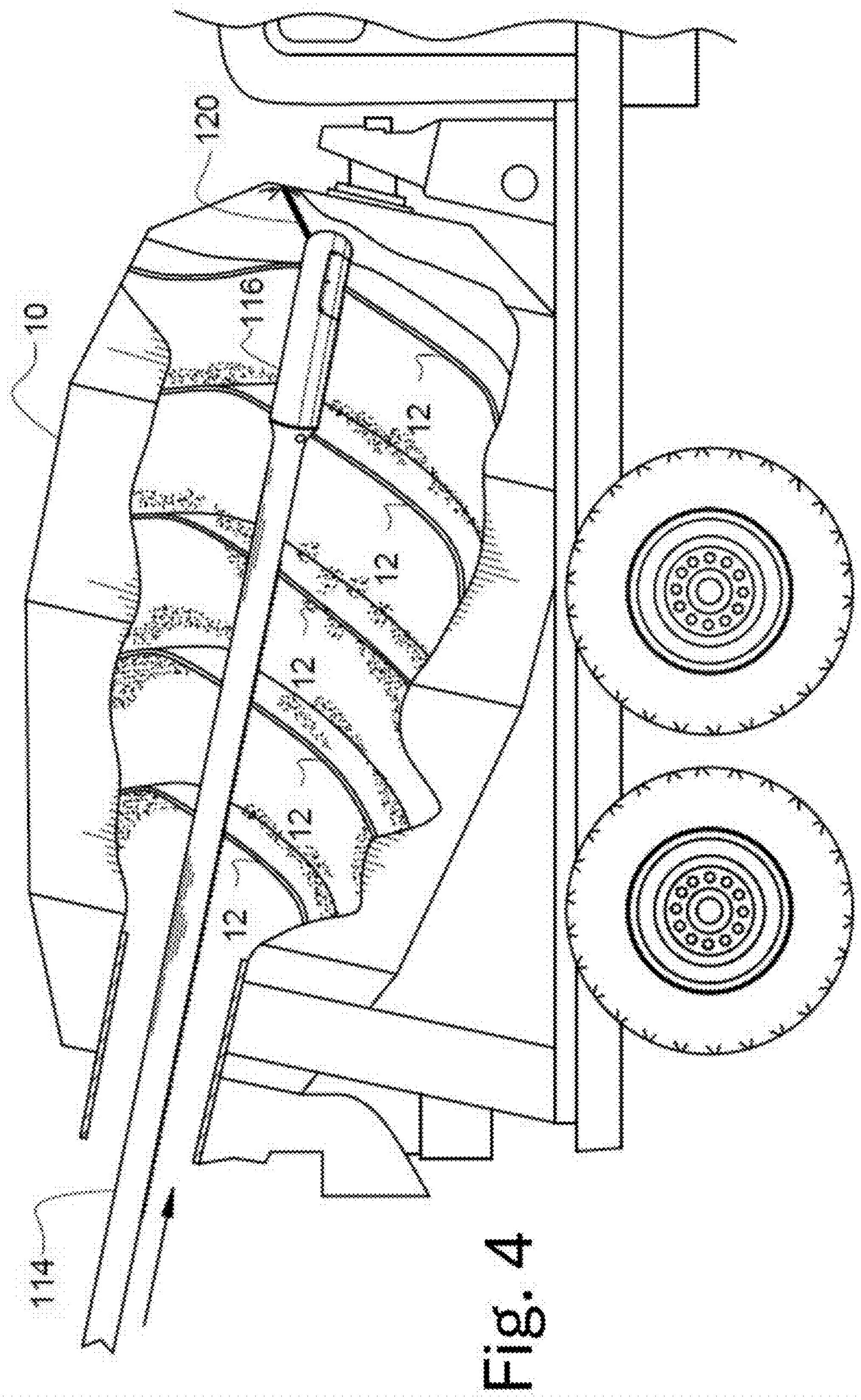
FIG. 4 is a sectional view depicting an embodiment of the boom disposed within the drum of a ready-mix concrete truck.
Figure 5:
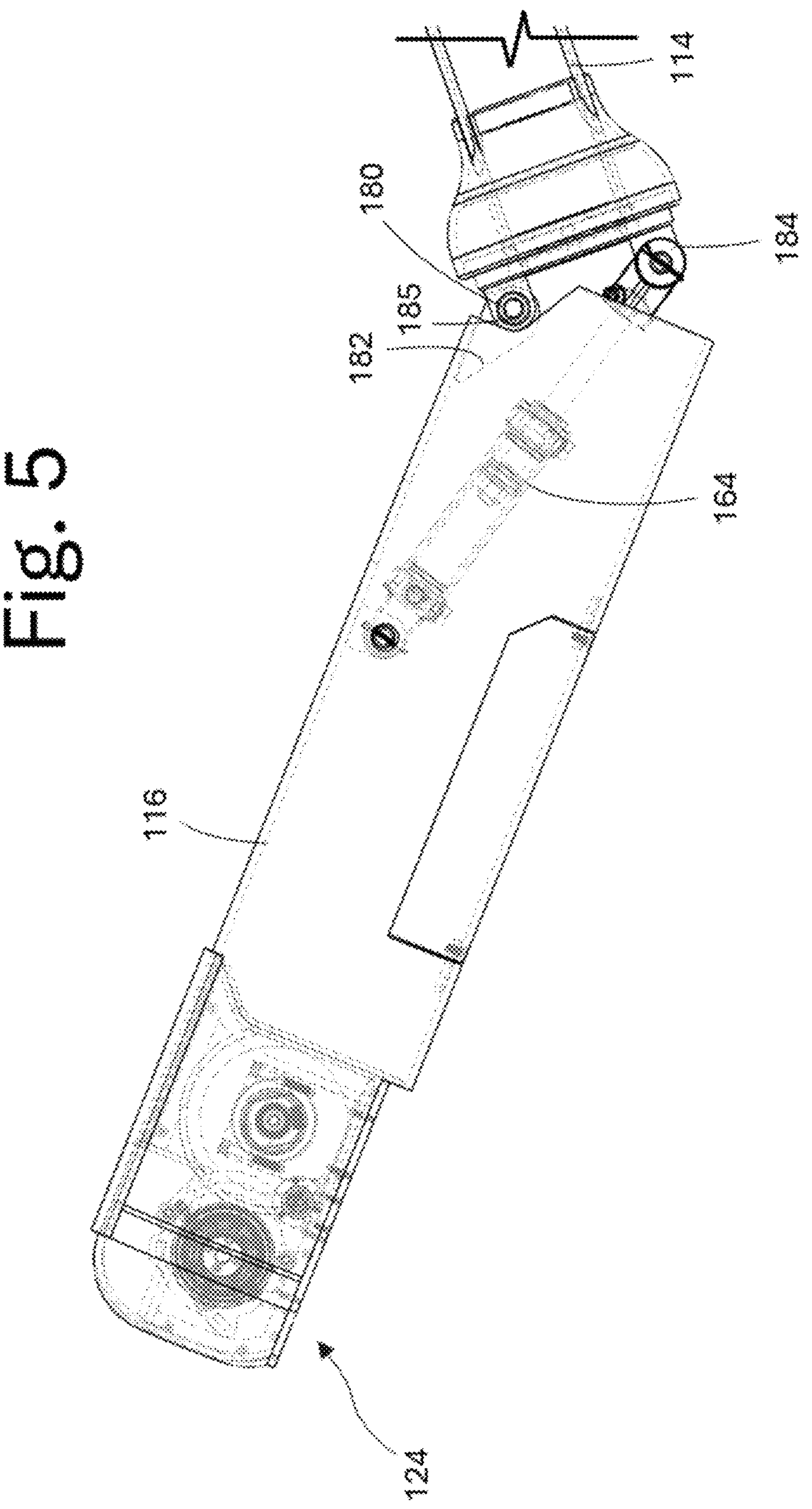
FIG. 5 is a close-up view of an embodiment of the nozzle housing.

Boom 114 is depicted in a retracted configuration in FIG. 2 and in an extended or partially extended configuration in FIGS. 1 and 3. Boom 114 is generally retracted prior to insertion into the hollow interior of a ready mixed concrete drum 10 through the opening in the drum. Boom 114 can then be extended to enter the drum 10 as shown in FIG. 4 to clean fins 12 and the head pack through high-pressure water jet 120.

Nozzle housing 116 also includes discharge slot 113 disposed proximate the leading end of nozzle housing 116 (see, e.g., FIGS. 6, 7, 15, and 17). The system also includes a boom location sensor configured to determine the location and amount of translation of boom 114. The boom location sensor may be located in boom housing 115 or another location sufficient to determine the amount of translation of boom 114 relative to a particular location about the system. In some embodiments, the boom location sensor is an encoder in operable engagement with the gearing that enables translation of boom 114. However, alternative sensors can be used, including but not limited to linear positioning sensors, laser sensors, inertial measurement units, and hall effect sensors.

Referring back to FIGS. 1-2, torpedo-shaped nozzle housing 116 is hingedly secured to the leading end of boom 114 via mount 145, and nozzle housing 116 is generally axially aligned with boom 114 when in a neutral position. Nozzle housing 116 includes nozzle 122, which is in fluidic communication with pump 112. Pump 112 delivers water to nozzle 122 at high pressure, for example at least about 15,000 psi, through one or more fluid lines extending along boom 114.

Nozzle 122 can include a nozzle head, such as a ceramic nozzle element or a sapphire nozzle element, housed in a stainless-steel nozzle body. In some embodiments, nozzle materials and nozzle geometry are selected to promote a coherent high-pressure water jet suitable for removing hardened concrete from the drum interior.

Nozzle housing 116 also includes discharge slot 113 disposed proximate the leading end of nozzle housing 116 (see, e.g., FIGS. 6, 7, 15, and 17). Discharge slot 113 has a length and shape sufficient to align with the discharge aperture of nozzle 122 at any location about the oscillation of nozzle 122. When pump 112 is operated, nozzle 122 discharges high-pressure water through discharge slot 113 as exemplified by water stream 120 in FIG. 4.

In some non-limiting embodiments, nozzle 122 has an angular stroke range and discharge slot 113 has a corresponding arcuate length that extends predetermined distances below and above the longitudinal axis of nozzle housing 116. In some non-limiting embodiments, the angular stroke range and discharge slot 113 extend approximately 35 degrees to approximately 55 degrees below the longitudinal axis of nozzle housing 116 and approximately 113 degrees to approximately 133 degrees above the longitudinal axis of nozzle housing 116. In some non-limiting embodiments, the angular stroke range extends approximately 45 degrees below the longitudinal axis of nozzle housing 116 and approximately 123 degrees above the longitudinal axis of nozzle housing 116, for a total angular stroke range of approximately 168 degrees.

As noted in the background section, the prior art device included a nozzle offset roughly eight inches from the distal end of the nozzle housing. The nozzle offset ensured that the high-pressure water could be directed to the entire rear surface of the fins in the concrete drum. However, the offset also increased the stand-off distance between the nozzle and the concrete surface being cut, which increased cleaning time required to blast away hardened concrete from the fins and the head pack, and in some instances prevented the high-pressure water from fully penetrating the head pack. In high-pressure water jetting, the jet exits the nozzle at high velocity, but as it travels away from the nozzle it spreads and begins to break up, which reduces jet coherence and causes the jet velocity to decay. Because cutting effectiveness depends on the kinetic energy delivered to the target and kinetic energy is proportional to the square of the jet velocity, even a relatively small loss in velocity over the stand-off distance results in a dramatic reduction in impact energy at the target. To cure this deficiency, embodiments of the present invention include a nozzle having a reduced offset (e.g., less than one inch) from the outer surface of the nozzle housing. Referring to FIGS. 5-9 and 16, nozzle oscillator assembly 124 is disposed in the leading end of nozzle housing 116. The reduction in standoff distance can reduce cleaning time, water usage, fuel consumption, component wear, and labor.

The prior art device also had a limited degree of oscillation while maintaining the nozzle within the nozzle housing to protect falling concrete. The limited oscillation is a result of the nozzle oscillator assembly (the rigid link and cam assembly). In addition, the nozzle oscillator assembly of the prior art device is also inefficient in that the stroke length is set based on the location at which the rigid link is secured to the cam and could only be modified if the device ceased operation and an operator disassembled the housing to alter the attachment of the link to the cam. In other words, the prior art nozzle oscillator assembly is incapable of on-the-fly adjustments to the stroke length of the nozzle or cessation of the oscillation for fixed blasting. The prior art device is also incapable of conveying to an operator the location of the nozzle about its stroke length.

Nozzle oscillator assembly 124, in combination with controller 136 and encoder 134, provides controlled oscillation of nozzle 122 through an angular stroke range. In some embodiments, controller 136 is configured to display nozzle position based on encoder feedback, to define forward and rear stop limits, and to adjust one or both stop limits during operation. In some embodiments, controller 136 is configured to command motor 130 to hold nozzle 122 at a selected angular position.

Figure 6:
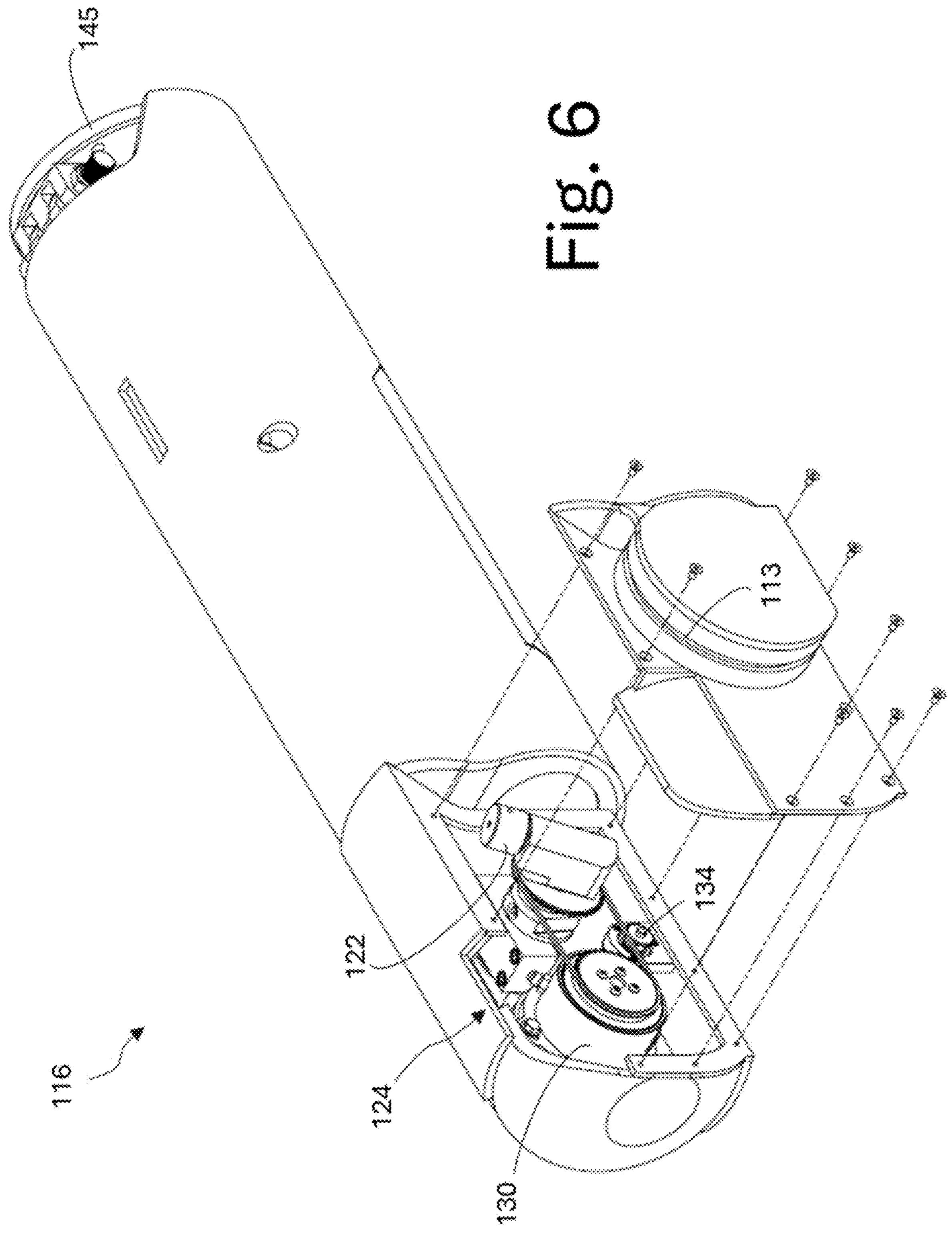
FIG. 6 is a partial exploded view of an embodiment of the nozzle housing.
Figure 7:
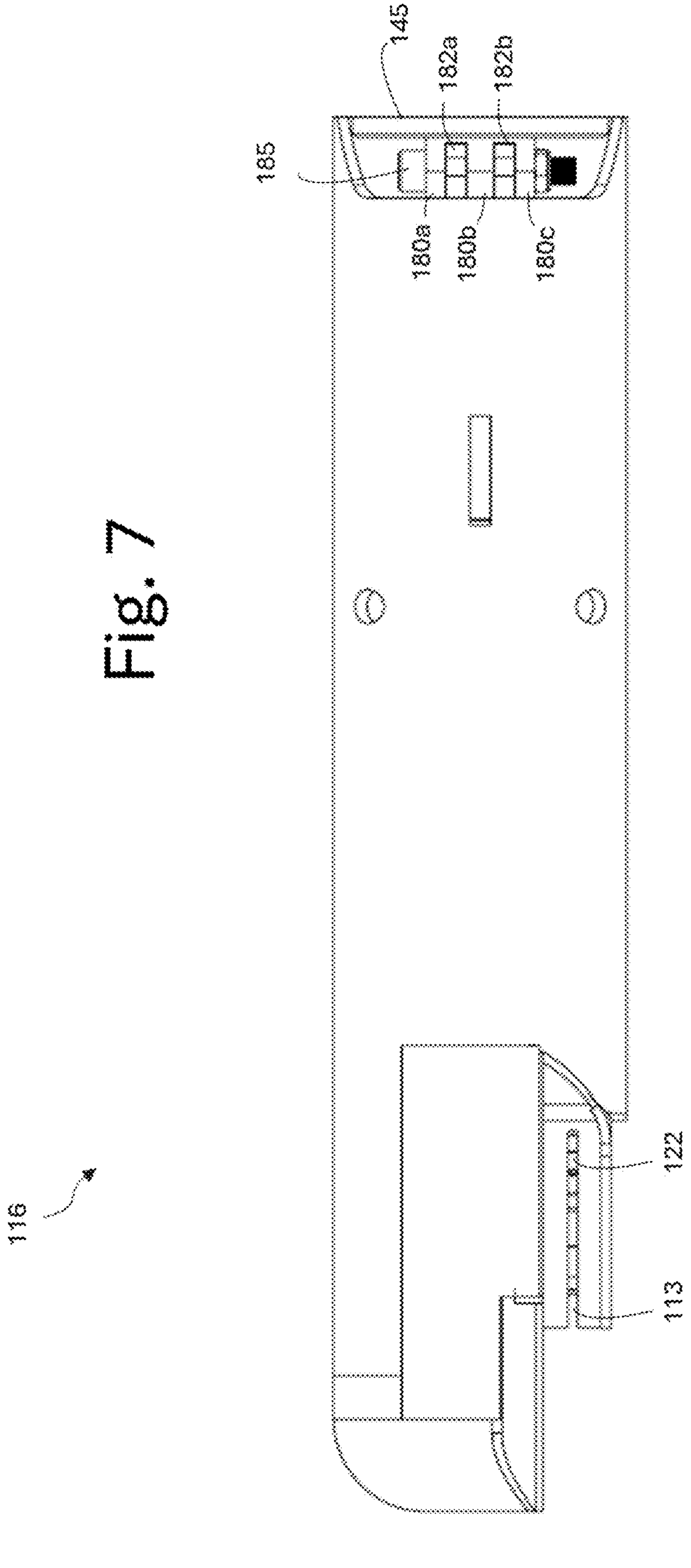
FIG. 7 is a top view of an embodiment of the nozzle housing.
Figure 8:
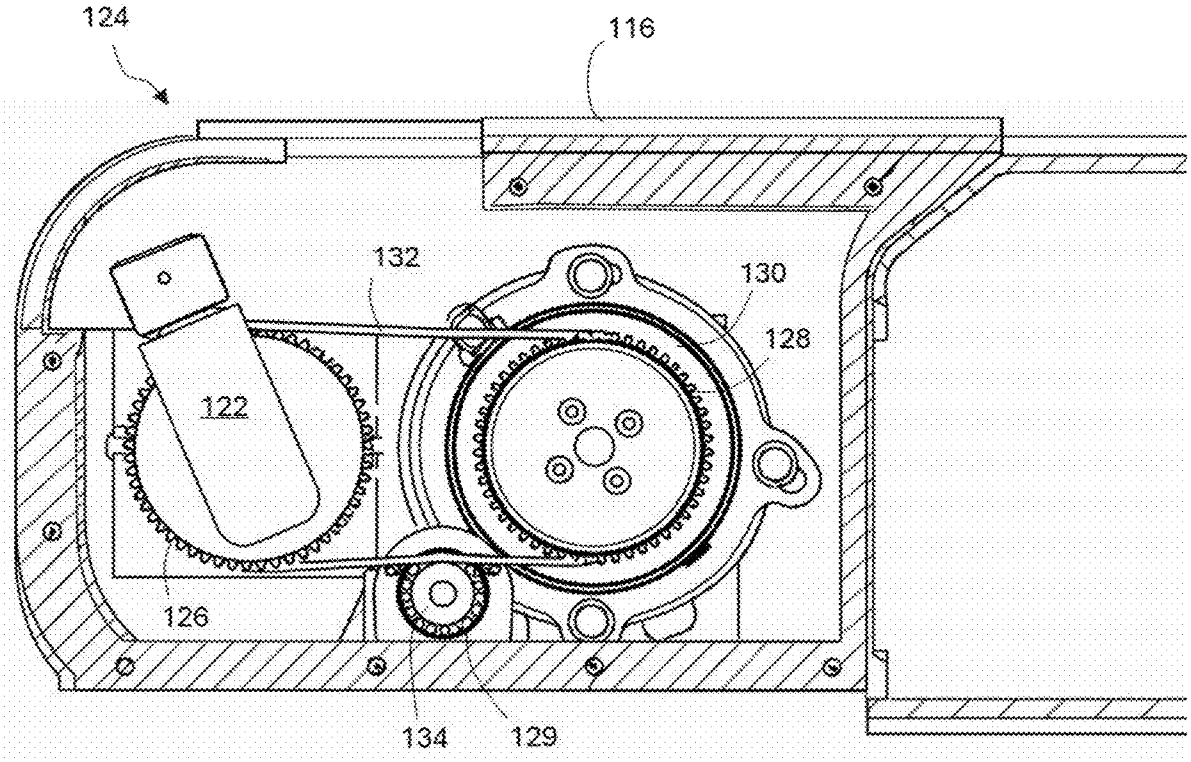
FIG. 8 is a sectional view of an embodiment of the nozzle housing.

Referring to FIGS. 5-9, nozzle oscillator assembly 124 is disposed in the leading end of nozzle housing 116 (see, e.g., FIG. 6). Nozzle oscillator assembly 124 includes nozzle 122, motor 130, encoder 134, and torque transmission components.

Figure 9:
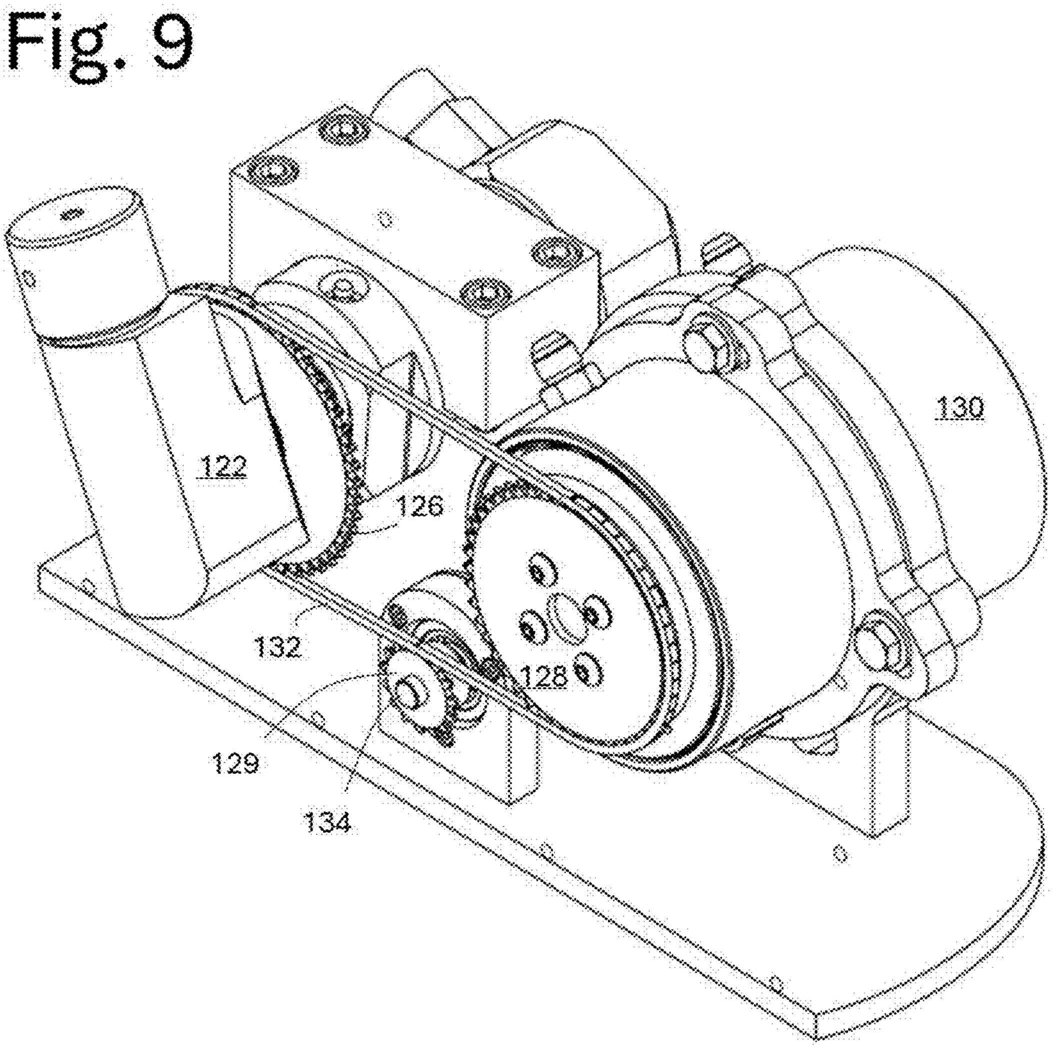
FIG. 9 is a perspective view of an embodiment of the nozzle assembly.

As best depicted in FIG. 9, nozzle 122 is secured to spur gear 126 in a non-rotational manner, such that nozzle 122 rotates in union with spur gear 126. Spur gear 126 is in operable communication with spur gear 128, which is secured to motor 130 such that rotation of the motor shaft (not depicted) causes rotation of spur gear 128. Rotation of the motor shaft and spur gear 128 drives belt 132, which in turn rotates spur gear 126 and nozzle 122. Encoder 134 is also in operable communication with drive belt 132 through spur gear 129 allowing encoder 134 to determine the degree of rotation of nozzle 122 and/or motor 130. Other drive trains can be used to transmit torque from motor 130 to nozzle 122, including gear trains, chain drives, and direct-drive couplings.

Motor 130 is configured to rotate in both a clockwise and a counterclockwise direction to effect oscillation of nozzle 122 about a nozzle stroke length. In some embodiments, motor 130 is configured to rotate between clockwise and counterclockwise limit points. Those limit points are sufficient to execute the stroke length disclosed in previous paragraphs. This motor functionality and resulting angular stroke range can be selected so that the water jet sweeps across fin surfaces over a range of drum fin geometries.

The present invention further includes controller 136. As non-limiting examples, controller 136 is configured to control the rotation of motor 130, the pivot of nozzle housing 116 relative to boom 114, the translation of boom 114, the pivot angle of boom housing 115 about its hinge, the height of tower 118, the operation of engine 110, and the operation of water booster pump 112. Controller 136 and supporting circuitry are in operable communication, via wired and/or wireless communication, with these components to enable control of the components.

Controller 136 may be a portable handheld unit and/or may be mounted to the observation tower or another structure of the device. Some embodiments include both a mounted controller and a handheld controller. In such embodiments, the controllers can communicate over a wired or wireless link so that either controller can be used to operate the device. Where simultaneous inputs occur, the control system can be configured to ignore, lock out, or prioritize one set of inputs to avoid conflicting commands.

Regardless of the number of controllers, controller(s) 136, in conjunction with nozzle oscillator assembly 124, enables an operator to precisely control the oscillatory motion of nozzle 122, alter the stroke length as desired, and/or fix nozzle 122 at a specific location along its stroke length. More specifically, controller 136 sends signals to the motor driver circuitry to initiate the oscillatory motion of motor 130, causing nozzle 122 to rotate back and forth about its stroke length. Encoder 134, through its operable engagement with belt 132 via gear 129 (or an alternative engagement with motor 130, spur gear 126, spur gear 128, and/or nozzle 122), continuously monitors the rotation of motor 130, providing real-time feedback to controller 136. It should be noted that encoder 134 can be any encoder/sensor known in the art for tracking rotation.

Figure 10:
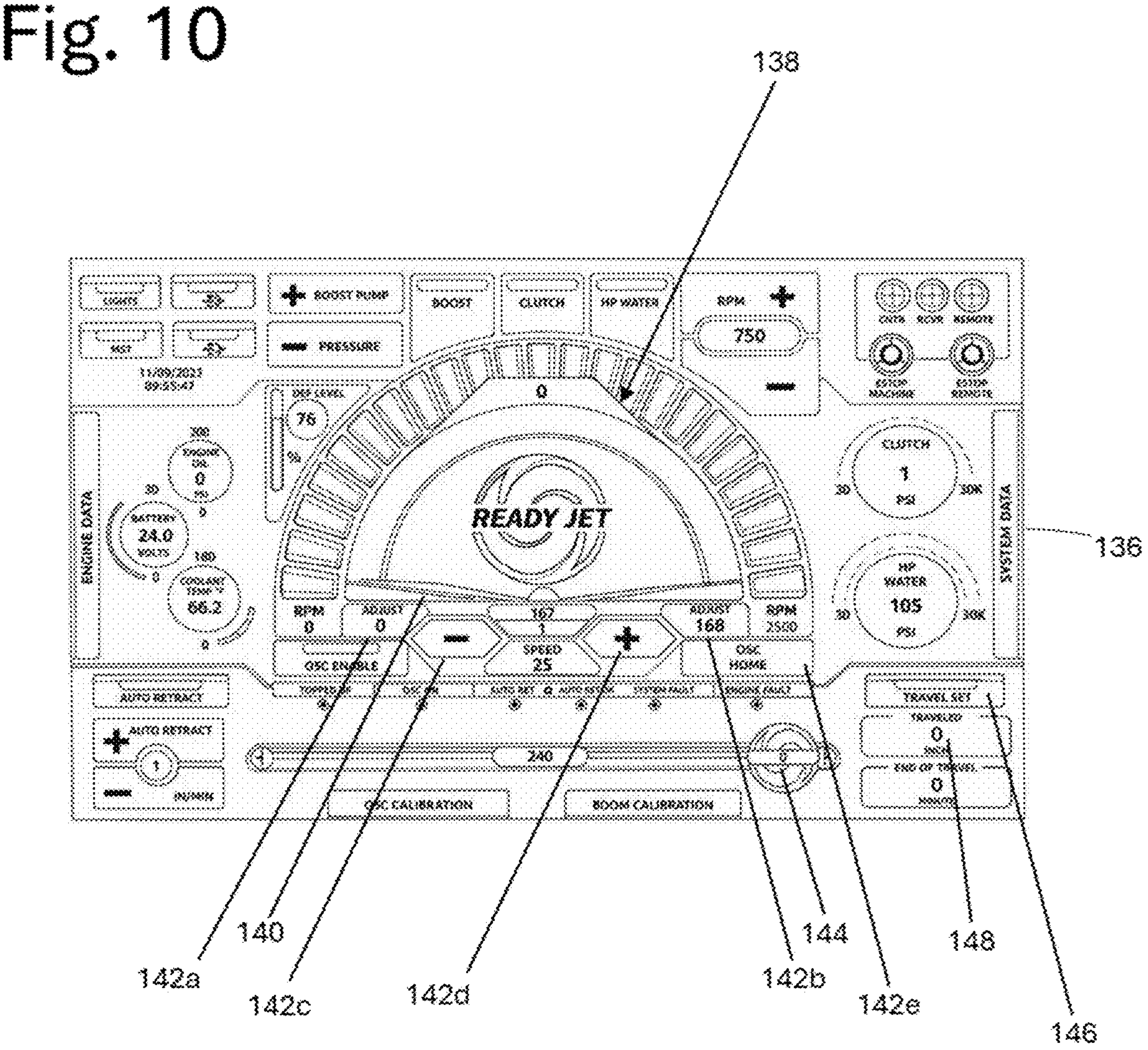
FIG. 10 depicts an embodiment of a user interface for an embodiment of the controller.
Figure 11:
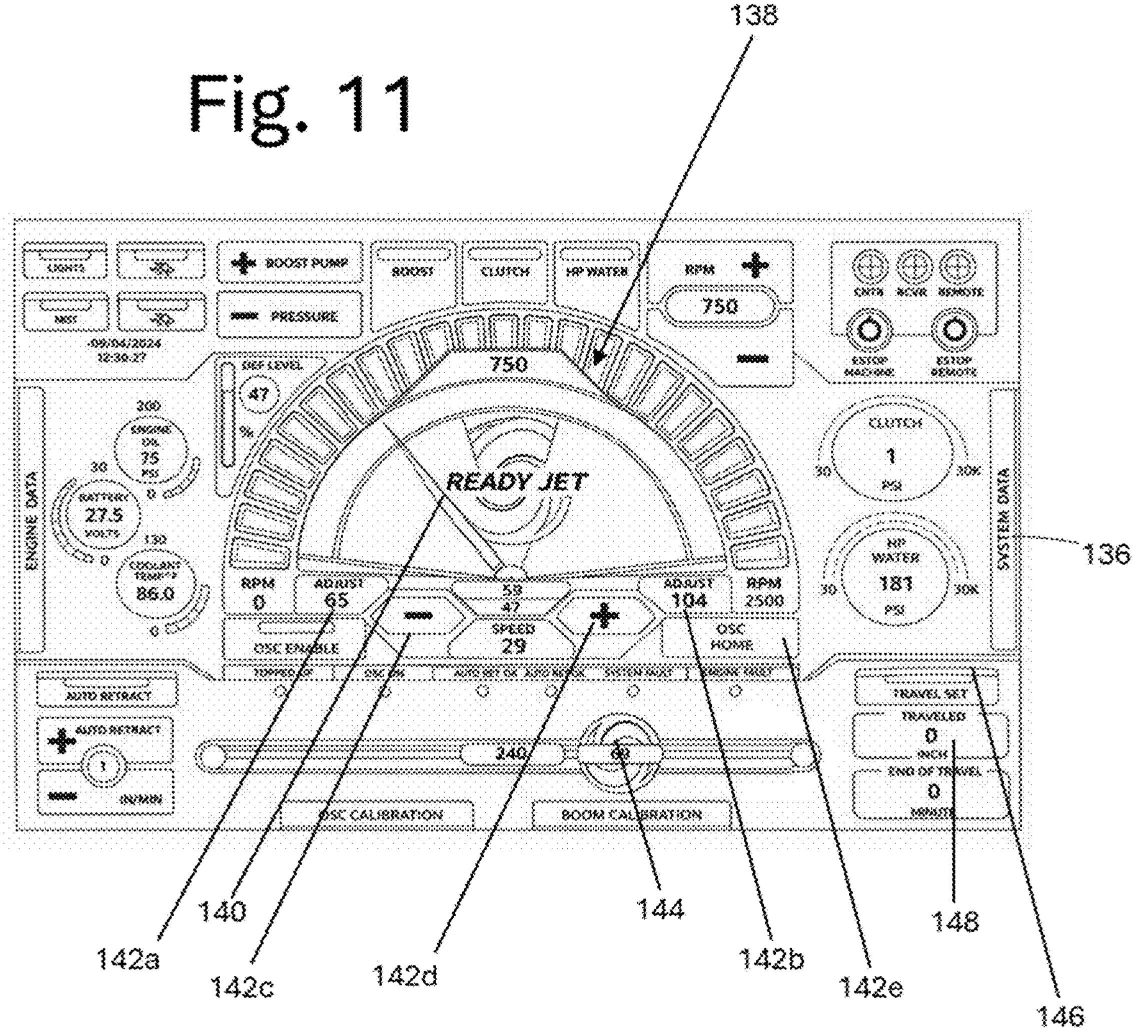
FIG. 11 depicts an embodiment of a user interface for an embodiment of the controller.

Controller 136 includes a user interface enabling the operator to view and adjust the stroke length dynamically. As illustrated in FIGS. 10-11, some embodiments of controller 136 include oscillation display 138 which is configured to actively depict the location of nozzle 122 about its oscillation through indicator 140 and also depict the stop limits for the oscillation. Controller 136 also includes actuators which provide the operator with the ability to alter the stroke length through forward stop actuator 142*a* and rear stop actuator 142*b*, oscillation speed through speed increasing actuator 142*c* and speed decreasing actuator 142*d*, and/or fix the nozzle at a location about its stroke through actuator 142*e* labeled "OSC HOME." Actuators 142 may be in any form known in the art for providing an interface with an operator including but not limited to buttons, touchscreen interfaces, joysticks, switches, touch sensors, trackballs, dials, etc. In addition, while the depicted controller 136 is shown as a digital touch screen, it should be understood that the one or more controllers 136 can be in alternative forms including a handheld unit with physical actuators, including but not limited to buttons, dials, and joysticks.

By inputting the desired stroke length, controller 136 processes the inputs and modifies the oscillation parameters of motor 130, allowing nozzle 122 to operate within the specified stroke length. This feature enables precise control over the rotation of nozzle 122, ensuring optimal cleaning efficiency by adapting to varying conditions within the drum.

To stop oscillation and hold nozzle 122 at a selected angular position, an operator can input a hold command via controller 136 (e.g., by selecting actuator 142*e* to move nozzle 122 to a selectable home position). In response, controller 136 commands motor 130 to rotate nozzle 122 to the selected position based on feedback from encoder 134 and to hold nozzle 122 at the selected position. The hold function can be implemented by applying motor torque, engaging a brake, and/or otherwise inhibiting rotation. The held position can be displayed using indicator 140 on oscillation display 138.

Controller 136 may also include a graphical and/or numerical boom position indicator 144 to convey to the operator the location of boom 114 based on the boom translation sensor. In addition, controller 136 includes a boom zeroing actuator 146 labeled "TRAVEL SET." Like actuators 142, boom zeroing actuator 146 may be in any form known in the art for providing an interface with an operator including but not limited to a button, touchscreen interface, joystick, switch, touch sensor, trackball, dial, etc. Boom zeroing actuator 146 allows the operator to set a position of boom 114 as the zero position, which is exemplified in FIG. 11. As depicted, boom 114 has been partially extended, but boom zeroing actuator 146 has been actuated causing the boom "traveled" display 148 to indicate that boom 114 is at a zero point/location.

When the operator positions boom 114 at the desired reference location within the concrete drum, the operator can actuate boom zeroing actuator 146 on controller 136. This action triggers controller 136 to record the current position of boom 114 relative to boom housing 115 or another reference point. Once set, this zero position serves as a reference point for subsequent translation of boom 114. If, for example, an operator identifies the entrance or the opposing wall of the drum as a zero point, then an operator can more readily distinguish the location of boom 114 within the drum.

Figure 12:
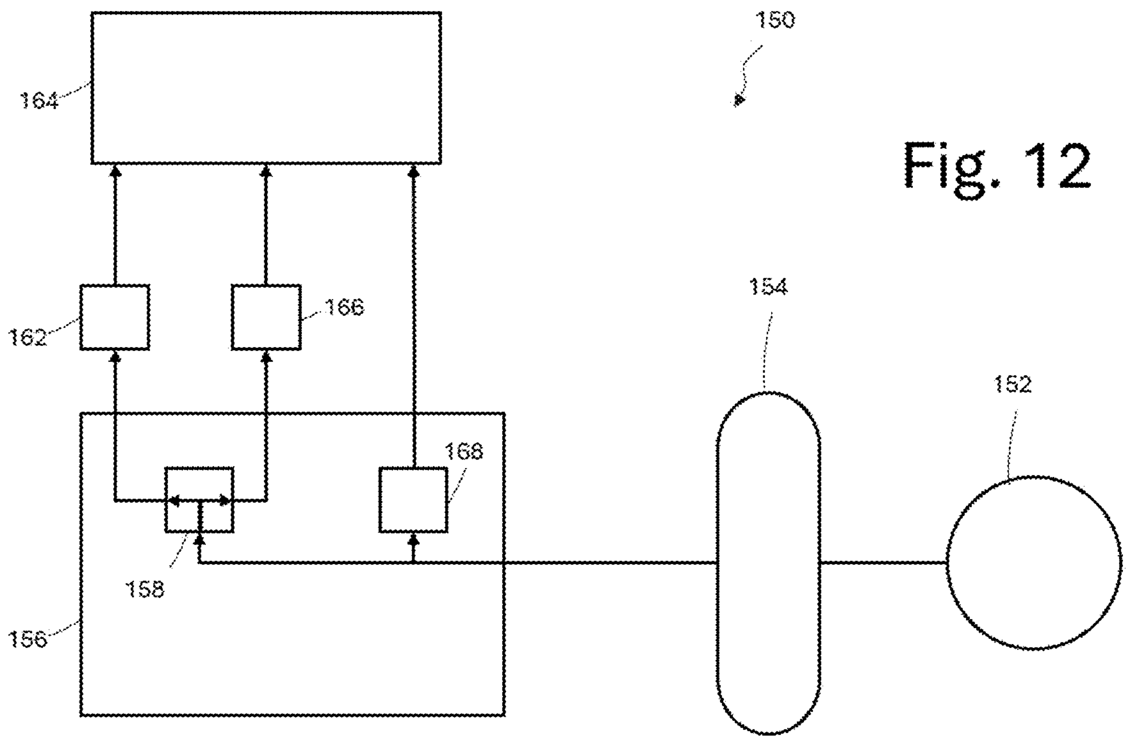
FIG. 12 is a block diagram representing an embodiment of hydraulic system 150 in accordance with an embodiment of the present invention.

Referring now to FIG. 12, the present invention includes a hydraulic system 150 configured to raise and lower nozzle housing 116 and also "power down" nozzle housing 116 out of contact with fins 12 and/or hardened concrete when significant resistance is encountered. This "power down" action refers to the rapid movement of nozzle housing 116 downward through greater hydraulic force than is typically used to lower nozzle housing 116.

Similar to the prior art device, nozzle housing 116 is hydraulically pivoted upwards to bring the leading end of nozzle housing 116 into close proximity of fins 12. The hydraulic nozzle positioning pressure is carefully tuned, considering the thrust of the water jet and the weight of nozzle housing 116, allowing it to "float" around fins 12 during the cleaning process. In the prior art device, the nozzle housing would sometimes snag on hardened concrete or fins 12, leading to situations where the nozzle housing and/or boom was forced beyond its elastic deformation limits, resulting in a destructive event.

To address this issue, hydraulic system 150 of the present invention employs both a lifting and lowering hydraulic assembly along with a power down hydraulic assembly. The lifting hydraulic assembly is responsible for pivoting the nozzle housing 116 upwards, bringing it close to the fins 12 for effective cleaning. The innovative aspect of the present invention lies in the lowering hydraulic assembly and the power down hydraulic assembly. The hydraulic nozzle positioning system 150 is configured to "charge," the lowering hydraulic assembly meaning it fills the system with hydraulic fluid, pressurizes it, and ensures that it is ready to operate when needed. This charging process occurs concurrently while the lifting hydraulic assembly is in use. The pre-charging of the lowering hydraulic assembly ensures that it is always ready to be activated quickly. The power down hydraulic assembly is also configured to quickly pull the torpedo downward through greater hydraulic forces. When significant resistance is detected, indicating that nozzle housing 116 might be snagged or at risk of a destructive event, the operator can instantly employ the pressurized hydraulic fluid in the power down hydraulic assembly to more rapidly power down nozzle housing 116. This rapid downward movement helps to disengage nozzle housing 116 from any obstructions, thereby minimizing the risk of damage to nozzle housing 116 or boom 114.

The operation of hydraulic system 150 begins with the initial setup and charging, where hydraulic pump 152 delivers pressurized hydraulic fluid to tank 154. Hydraulic pump 152 and tank 154 may be any known in the art. Hydraulic pump 152 is configured to pressurize the hydraulic fluid to a pressure of approximately 2,750 PSI and tank 154 is configured to retain hydraulic fluid at said pressure.

The pressurized fluid is directed through suitable high pressure fluid lines into manifold 156. Manifold 156 includes a plurality of ports and valves to control the flow of hydraulic fluid to the system. One such port directs hydraulic fluid into control valve 158. Control valve 158 is configured to direct hydraulic fluid into the lifting and lowering hydraulic assemblies. In some embodiments, control valve 158 is a two-way shuttle valve with magnets configured to alter the location of an internal shuttle to open and close two outlet ports in the valve. However, control valve 158 may be any other type of valve known in the art that can control the flow of incoming hydraulic fluid through two or more ports.

The lifting hydraulic assembly includes fluid lines extending from control valve 158 to reducing valve 162 and fluid lines extending from reducing valve 162 to nozzle housing actuator 164. In some embodiments, reducing valve 162 is a valve configured to reduce the pressure of the hydraulic fluid from approximately 2,750 PSI to approximately 1,250 PSI. In some embodiments, the reducing valve 162 is configured to reduce the pressure of the hydraulic fluid from approximately 2,750 PSI to a pressure that overcomes the force of gravity plus the force of water jet 120 exiting nozzle 122. The hydraulic pressure is finely tuned to balance the weight of the nozzle housing 116 and the thrust of the water jet, allowing it to hover or float close to the fins 12 without exerting excessive force.

The lowering hydraulic assembly includes fluid lines extending from control valve 158 to reducing valve 166 and fluid lines extending from reducing valve 166 to nozzle housing actuator 164. In some embodiments, reducing valve 166 is a valve configured to reduce the pressure of the hydraulic fluid from approximately 2,750 PSI to approximately 250 PSI.

During use, tank 154 delivers pressurized hydraulic fluid to manifold 156. When the operator triggers controller 136 to lift nozzle housing 116, control valve 158 opens to allow pressurized fluid to fill the hydraulic lines between control valve 158 and both reducing valves 162 and 166. Reducing valve 166 remains closed but the hydraulic line between control valve 158 and reducing valve 166 is charged with pressurized hydraulic fluid. Unlike reducing valve 166, reducing valve 162 opens allowing hydraulic fluid at the reduced pressure to cause nozzle housing actuator 164 to lift/pivot nozzle housing 116 upwards towards fins 12.

The operator continuously monitors the force exerted on nozzle housing 116. If the operator detects resistance, the operator can use the controller to initiate a lowering action. In doing so, control valve 158 closes reducing valve 162 (and/or closes the outlet port to the lifting hydraulic assembly) and opens reducing valve 166. When reducing valve 166 opens, hydraulic fluid, at the reduced pressure, causes nozzle housing actuator 164 to drop/pivot nozzle housing 116 downwards away from fins 12. Because the lowering hydraulic assembly is pre-charged, the nozzle housing 116 is lowered more quickly in comparison to prior art devices, which reduces the risk of damage to the unit. Once the obstruction is cleared, the operator can re-initiate the lifting hydraulic assembly to resume the cleaning operation, with the hydraulic nozzle positioning system 150 automatically recharging the lowering hydraulic assembly to ensure it is ready for the next cycle.

If significant resistance is detected, indicating that nozzle housing 116 has encountered an obstruction such as hardened concrete, the operator can activate the power down function via the control interface on controller 136. This function causes power down valve 168 to open and direct the fully pressurized hydraulic fluid from tank 154 to nozzle housing actuator 164 to rapidly drop/pivot nozzle housing 116 downwards away from fins 12. The rapid lowering of nozzle housing 116 substantially reduces the risk of damage to the unit in comparison to prior art devices.

In some embodiments, the system monitors resistance encountered by nozzle housing 116 using pressure sensors and/or other sensors integrated into the hydraulic lines, boom 114, nozzle housing 116, and/or other portions of the system. If significant resistance is detected, indicating that nozzle housing 116 has encountered an obstruction such as hardened concrete or a fin, the sensors trigger an alert to the operator. Upon receiving an alert, the operator can activate the lowering hydraulic assembly or the power down function via controller 136. Some embodiments are configured to automatically initiate a power down if the sensors detect significant resistance to further expedite the process of dropping nozzle housing 116 downward.

The improved hydraulic system 150 offers several advantages, including minimizing the risk of destructive events by reducing the likelihood of nozzle housing 116 or boom 114 being forced beyond their elastic limits, preventing costly and dangerous breakages. It also enhances operational efficiency by allowing for smoother and more continuous operation through the ability to quickly and effectively disengage nozzle housing 116 from obstructions. Additionally, the system improves safety by providing a rapid response mechanism to lower nozzle housing 116, protecting both the equipment and the operator.

Figure 13:
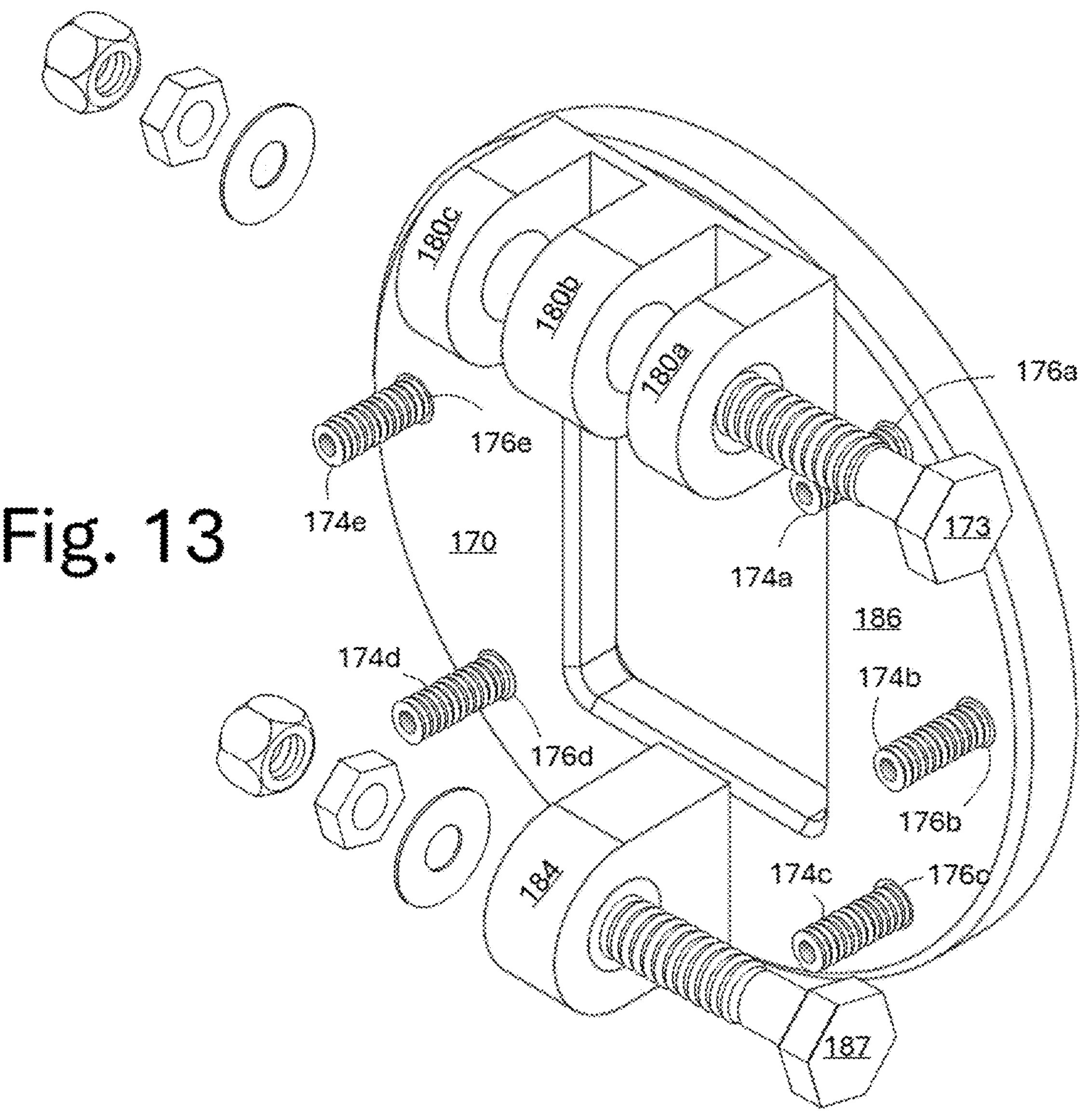
FIG. 13 is a perspective view of an embodiment of the breakaway hinge.

Referring now to FIG. 13, some embodiments of the present invention include breakaway hinge 170. Breakaway hinge 170 is configured to allow nozzle housing 116 to pivot relative to boom 114 and function as an intentional break point to enhance the safety and reliability of the system by limiting potential damage in critical situations.

To provide the pivoting connection, breakaway hinge 170 includes boom-side hinge body 186 configured to be connected to boom 114 through a series of fasteners 1741*a*-174*e* that pass through fastener apertures 176*a*-176*e*. In the embodiment shown in FIG. 13, fastener 174*a* includes head portion 173. Breakaway hinge 170 also includes a series of pin mounts 180 extending toward nozzle housing 116 in a spaced apart manner, for example, pin mounts 180*a*-180*c*. The spaces are configured to accommodate corresponding pin mounts 182 on nozzle housing 116, for example, pin mounts 182*a* and 182*b* (see FIG. 7). Pivot pin 185 (see, e.g., FIGS. 5 and 7) passes through pin mounts 180 and 182, thereby defining a pivot axis about which nozzle housing 116 pivots relative to boom 114.

Figure 14:
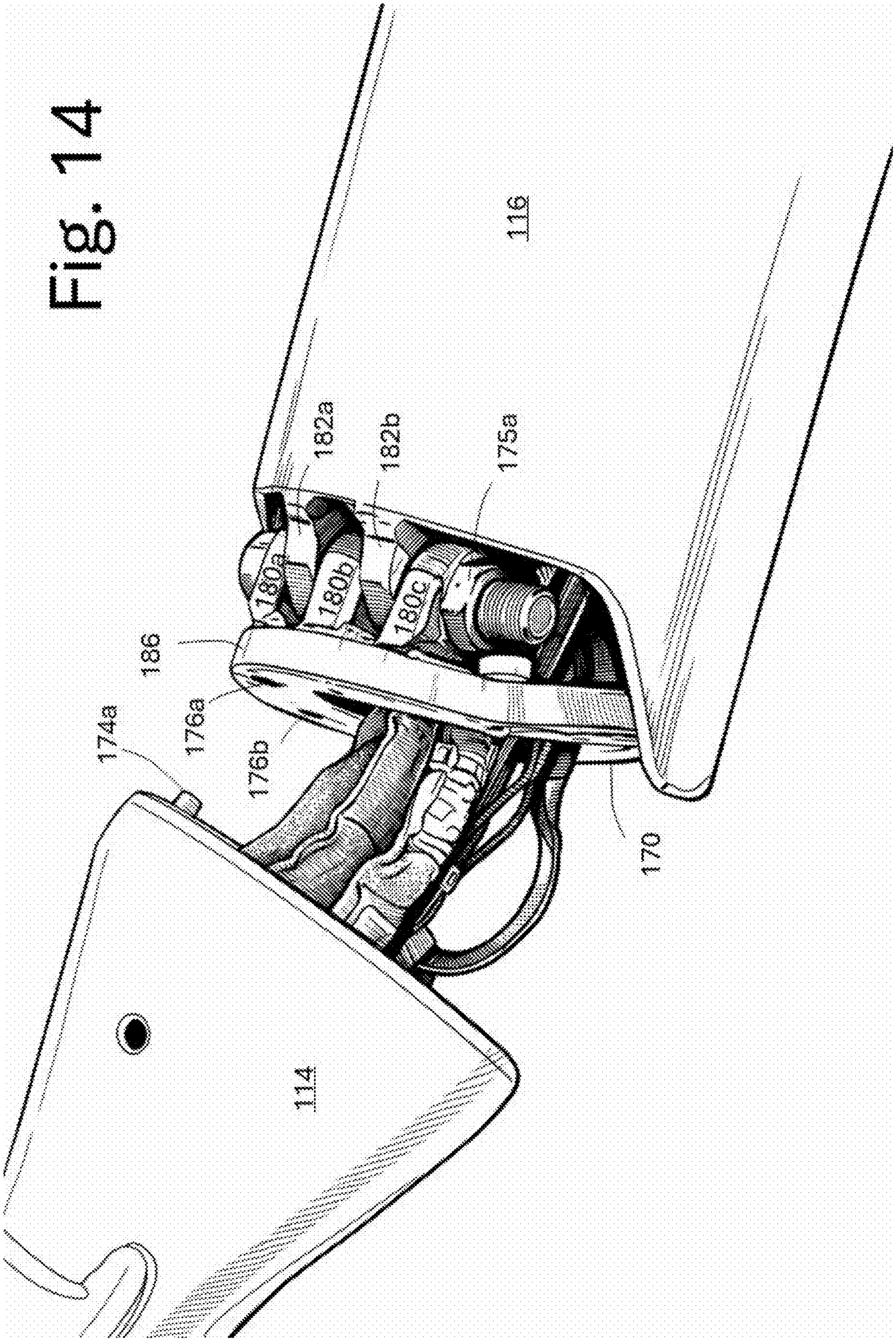
FIG. 14 is a partial cutaway view of a proximal end portion of the nozzle housing showing a breakaway hinge plate and representative fastener hardware.
Figure 15:
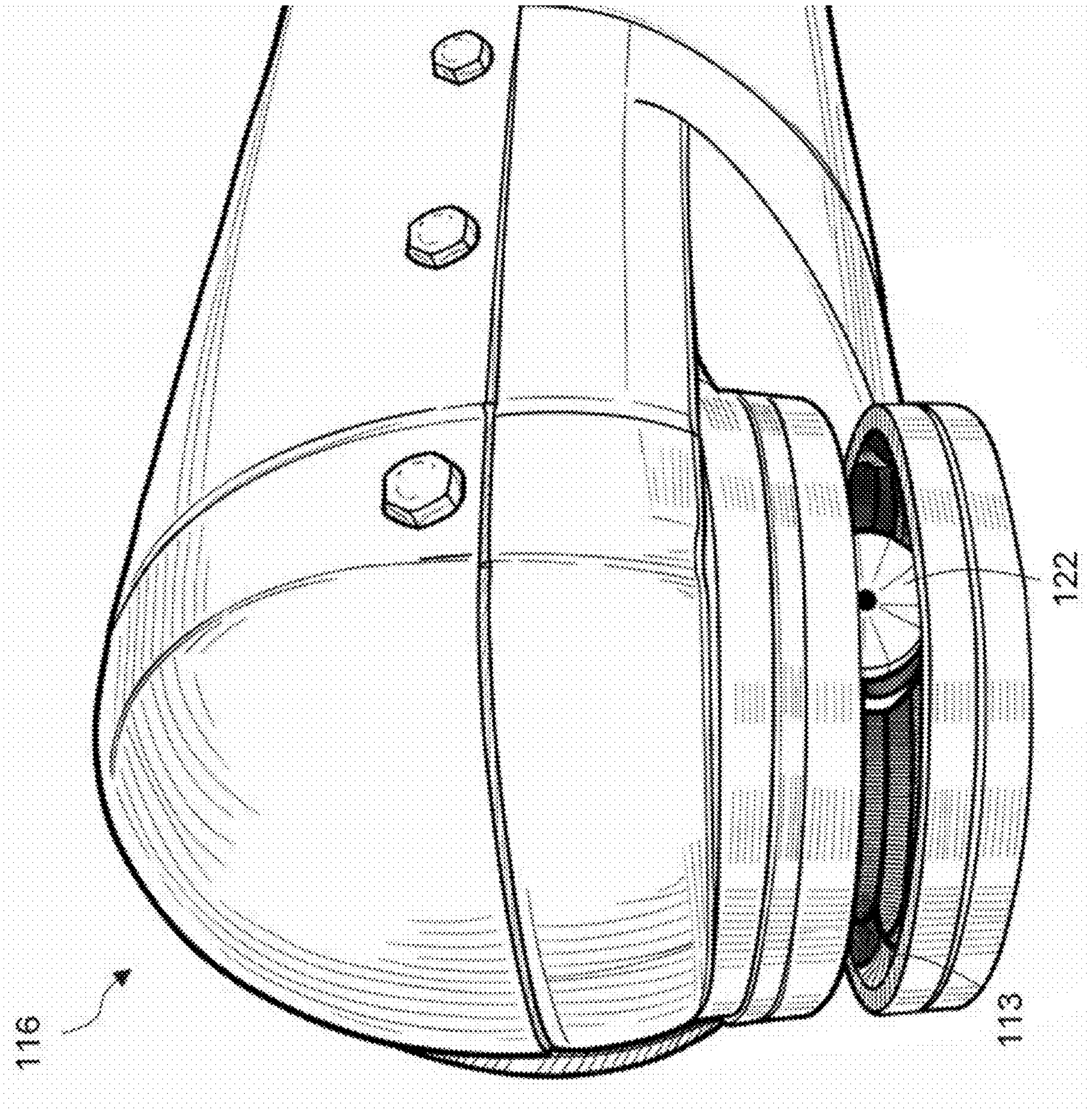
FIG. 15 is a perspective view of a leading end portion of the nozzle housing showing a discharge slot and a nozzle.
Figure 16:
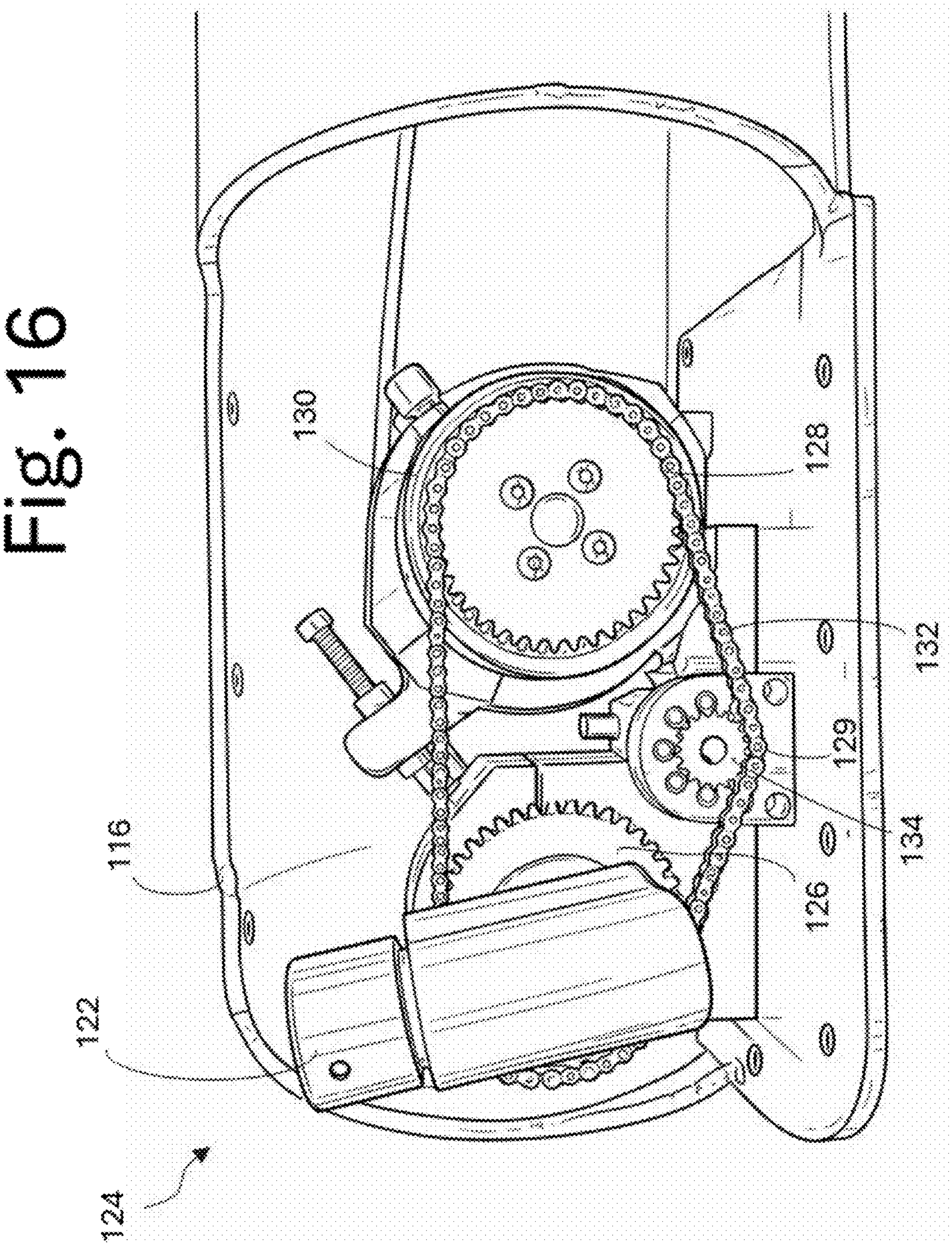
FIG. 16 is a partial cutaway view of the nozzle housing showing a nozzle oscillator assembly.
Figure 17:
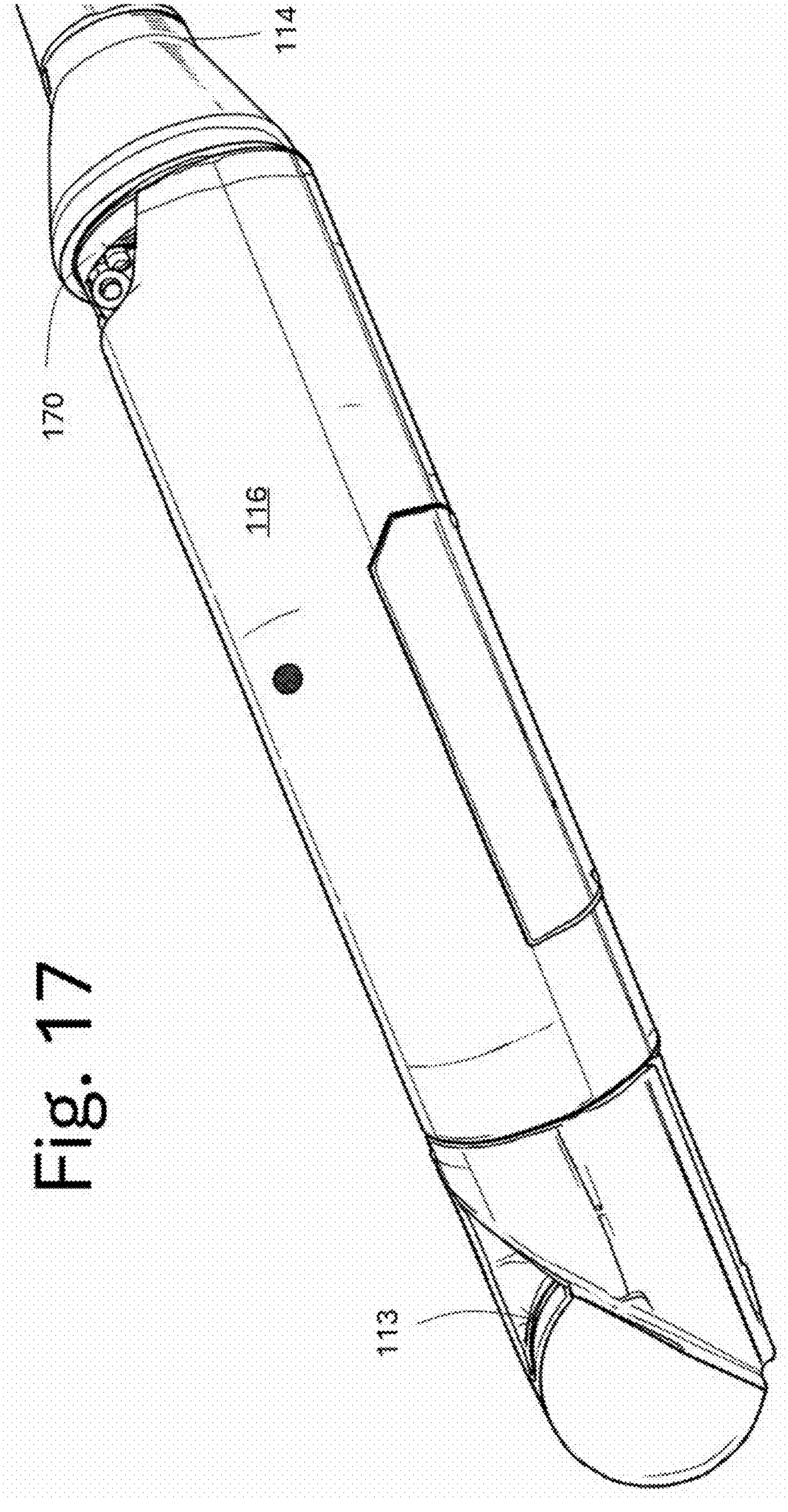
FIG. 17 is a perspective view of the nozzle housing coupled to the boom and showing a discharge slot.

Breakaway hinge 170 also includes actuator mount 184, which is configured to receive an actuator coupling pin 175*a* (see FIG. 14) that couples breakaway hinge 170 to nozzle housing actuator 164. In the embodiment shown in FIG. 13, actuator coupling pin 175*a* can be implemented as a bolt having a head portion 187. When nozzle housing actuator 164 extends (see FIG. 5) nozzle housing 116 pivots about pivot pin 185 relative to boom 114. When nozzle housing actuator 164 extends (see FIG. 5) nozzle housing 116 pivots about the longitudinal axis of the pin passing through pin mounts 180 and 182. In this manner, breakaway hinge enables precise positioning and movement necessary for effective cleaning of the concrete drum.

Breakaway hinge 170 also includes a breakaway mechanism, which serves as an intentional break point. This mechanism is engineered to disengage nozzle housing 116 from boom 114 when subjected to excessive force or torque beyond a predetermined threshold ("the breakaway threshold") and the operator or the system fails to disengage nozzle housing 116. The breakaway threshold is less than the force or torque required to plastically deform boom 114. The breakaway mechanism is calibrated to respond to situations where nozzle housing 116 encounters significant resistance, such as becoming stuck against hardened concrete or the internal fins of the drum, without permanently damaging boom 114 or other components on the unit.

In normal operation, the breakaway hinge allows the nozzle housing to pivot smoothly and adjust its position as directed by the operator. The hydraulic system moves the nozzle housing up and down, with breakaway hinge 170 facilitating these movements. However, if the operator does not act quickly enough to power down nozzle housing 116 in response to an obstruction, or if nozzle housing 116 becomes unexpectedly lodged, the breakaway mechanism allows nozzle housing 116 to detach from boom 114. This intentional separation is designed to prevent the transmission of damaging forces to the rest of the system, thereby protecting critical components. The detached nozzle housing can then be easily retrieved and reattached, minimizing downtime and repair costs.

In some embodiments, the breakaway mechanism is in the form of a set of pre-stressed bolts, such as fasteners 174*a* and 174*b* (FIG. 13), that retain hinge plate 186 to boom 114 under normal operating conditions, thereby coupling nozzle housing 116 to boom 114, and that shear and/or disengage when the applied force or torque exceeds the calibrated threshold. Additionally, or alternatively, the breakaway mechanism can be in the form of welds that secure one or more of pin mounts 180*a-c* and/or actuator mount 184 to hinge plate 186, with the welds configured to fail when the breakaway threshold is met. These bolts are configured to shear and/or disengage when the applied force exceeds the calibrated threshold. Additionally, or alternatively, mounts 180-184 and/or corresponding pins may be configured to function as the breakaway mechanism by ensuring nozzle housing 116 remains securely attached during regular use while allowing for controlled separation under excessive stress. In some embodiments, the breakaway mechanism is in the form of welds that secure mounts 180-184 to surface 186, with the welds configured to fail when the breakaway threshold is met.

This breakaway feature significantly enhances the system's resilience by providing a fail-safe mechanism to protect against unforeseen incidents. It ensures that any potential damage is localized to the nozzle housing, which can be more easily repaired or replaced, rather than affecting the entire system. This design consideration is crucial for maintaining the long-term durability and reliability of the concrete drum cleaning system, ensuring continuous and efficient operation with minimal interruptions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for removing residual concrete from an interior of a rotatably mounted ready mixed concrete truck drum, comprising:

a. an elongated boom configured to be inserted into the drum;

b. a nozzle housing coupled to a leading end of the elongated boom, the nozzle housing having a leading end and an outer surface;

c. a discharge slot formed through the nozzle housing proximate the leading end;

d. a high-pressure nozzle rotatably mounted within the nozzle housing, the high-pressure nozzle including a discharge aperture;

e. a motor operably coupled to the high-pressure nozzle and configured to oscillate the high-pressure nozzle through an angular stroke range; and f. a source of high-pressure water fluidically coupled to the high-pressure nozzle; wherein a standoff distance between the discharge aperture and the outer surface of the nozzle housing proximate the leading end is less than about 1 inch; and wherein the discharge slot has a length and shape sufficient to align with the discharge aperture throughout the angular stroke range such that a high-pressure water jet is discharged from the high-pressure nozzle through the discharge slot while the high-pressure nozzle oscillates.

2. The system of claim 1, wherein the high-pressure nozzle remains within the nozzle housing throughout the angular stroke range.

3. The system of claim 2, wherein the source of high-pressure water is configured to supply water to the high-pressure nozzle at a pressure of at least about 15,000 psi.

4. The system of claim 3, wherein the high-pressure nozzle includes a nozzle head comprising a ceramic element or a sapphire element.

5. The system of claim 4, wherein the angular stroke range extends from about 35 degrees to about 55 degrees below a longitudinal axis of the nozzle housing and from about 113 degrees to about 133 degrees above the longitudinal axis of the nozzle housing.

6. The system of claim 5, wherein the angular stroke range is about 168 degrees.

7. The system of claim 6, further comprising a nozzle drive train disposed within the nozzle housing, the nozzle drive train including:

a. a first spur gear non-rotatably coupled to the high-pressure nozzle;

b. a second spur gear coupled to an output shaft of the motor; and c. an endless belt coupling the second spur gear to the first spur gear to transmit torque from the motor to the high-pressure nozzle.

8. The system of claim 7, further comprising an encoder operably coupled to the endless belt via a third spur gear, the encoder configured to provide position feedback corresponding to an angular position of the high-pressure nozzle along the angular stroke range.

9. A nozzle housing assembly for a concrete drum cleaning system, comprising:

a. a nozzle housing having a proximal end configured for attachment to an elongated boom and a leading end, the nozzle housing having an outer surface;

b. a discharge slot formed through the nozzle housing proximate the leading end;

c. a high-pressure nozzle rotatably mounted within the nozzle housing, the high-pressure nozzle including a discharge aperture;

d. a motor operably coupled to the high-pressure nozzle and configured to oscillate the high-pressure nozzle through an angular stroke range; and e. a fluid conduit interface configured to receive high-pressure water from a source of high-pressure water and to deliver the high-pressure water to the high-pressure nozzle; wherein a standoff distance between the discharge aperture and the outer surface of the nozzle housing proximate the leading end is less than about 1 inch; and wherein the discharge slot has a length and shape sufficient to align with the discharge aperture throughout the angular stroke range.

10. The nozzle housing assembly of claim 9, wherein the nozzle housing is torpedo-shaped.

11. The nozzle housing assembly of claim 10, wherein the discharge slot is arcuate about a rotational axis of the high-pressure nozzle.

12. The nozzle housing assembly of claim 11, wherein the angular stroke range extends from about 35 degrees to about 55 degrees below a longitudinal axis of the nozzle housing and from about 113 degrees to about 133 degrees above the longitudinal axis of the nozzle housing.

13. The nozzle housing assembly of claim 12, wherein the angular stroke range is about 168 degrees.

14. The nozzle housing assembly of claim 13, further comprising a nozzle drive train including:

a. a first spur gear non-rotatably coupled to the high-pressure nozzle;

b. a second spur gear coupled to an output shaft of the motor; and c. an endless belt coupling the second spur gear to the first spur gear to transmit torque from the motor to the high-pressure nozzle.

15. The nozzle housing assembly of claim 14, further comprising:

a. an encoder configured to provide position feedback indicative of an angular position of the high-pressure nozzle; and b. a controller in operable communication with the motor and the encoder; wherein the controller is configured to define the angular stroke range using a first stop limit and a second stop limit.

16. The nozzle housing assembly of claim 15, wherein the controller is configured to change at least one of the first stop limit and the second stop limit while oscillation of the high-pressure nozzle is in progress and to command the motor to hold the high-pressure nozzle at a selected angular position.

* * * * *